Figure 5:
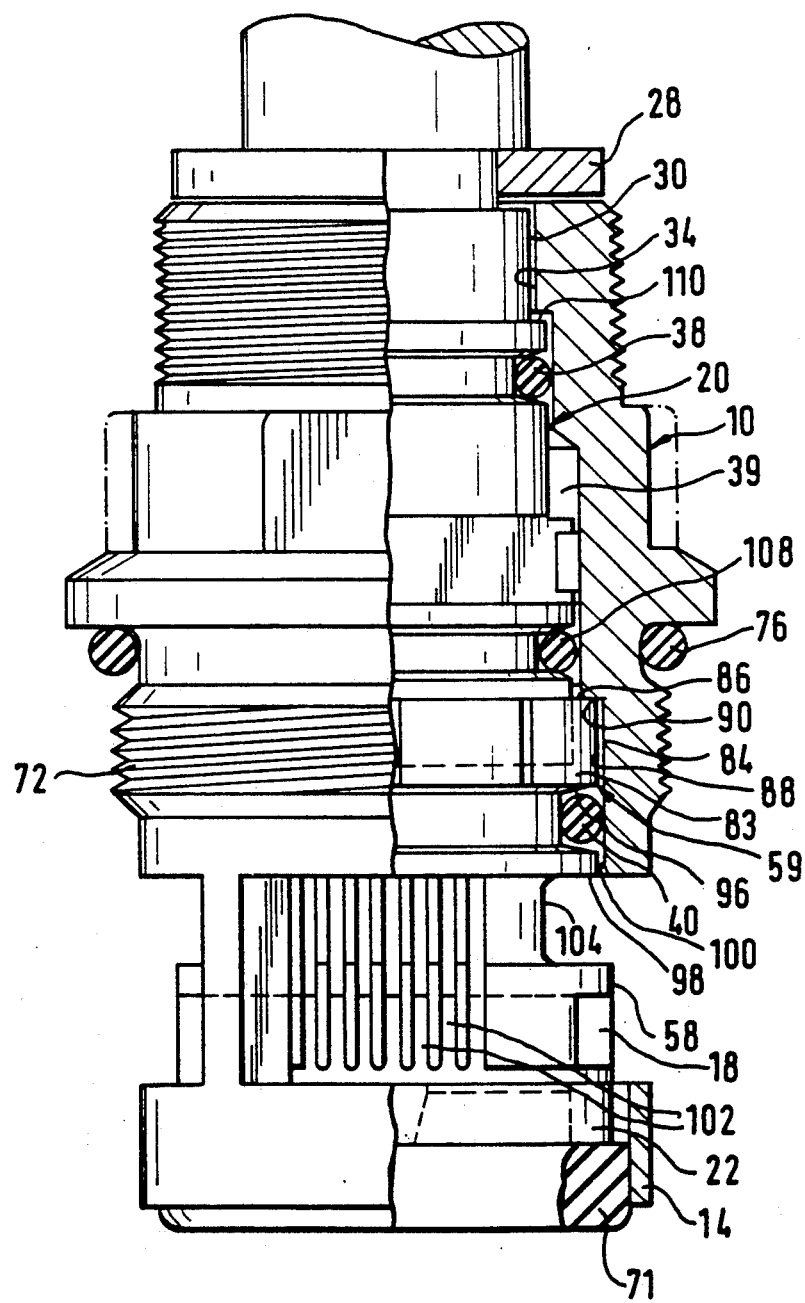

United States Patent [19]
Stoll et al.

[11] Patent Number: 5,176,168
[45] Date of Patent: Jan. 5, 1993

[54] VALVE TOP

[75] Inventors: Joerg M. Stoll; Rudolf Koch, both of Triberg, Fed. Rep. of Germany

[73] Assignee: Anton Tränkle KG, Triberg, Fed. Rep. of Germany

[21] Appl. No.: 823,780

[22] Filed: Jan. 21, 1992

[30] Foreign Application Priority Data

Jan. 23, 1991 [DE] Fed. Rep. of Germany ....... 4101836

[51] Int. Cl.⁵ .................... F16K 3/16; F16K 11/074
[52] U.S. Cl. ............................ 137/454.5; 137/625.31; 251/208; 251/355; 251/127
[58] Field of Search ............ 137/454.5, 454.6, 625.31; 251/208, 304, 355, 127

[56] References Cited

U.S. PATENT DOCUMENTS

| | | | |
|---|---|---|---|
| 2,011,087 | 8/1935 | Sherman | 251/355 X |
| 3,398,964 | 8/1968 | Trefil | 251/355 X |
| 3,633,870 | 1/1972 | Bayer | 251/355 X |
| 3,780,758 | 12/1973 | DeVries | 137/454.6 |
| 4,651,770 | 3/1987 | Denham et al. | 137/454.5 X |
| 4,793,375 | 12/1988 | Marty | 251/208 X |
| 4,821,765 | 4/1989 | Iqbal et al. | 137/454.5 X |
| 4,896,693 | 1/1990 | Rodriguez | 137/454.5 |
| 4,924,903 | 5/1990 | Orlandi | 251/304 |

FOREIGN PATENT DOCUMENTS 3714450  11/1988  Fed. Rep. of Germany ...... 251/208

Primary Examiner—John Rivell
Attorney, Agent, or Firm—Lackenbach Siegel Marzullo Aronson & Greenspan

[57] ABSTRACT

Valve top, in particular for water fittings, with a spindle rotatable in a head-piece and a sealed grease chamber in the head-piece. The lower end of the spindle is mounted and supported in the head-piece by means of a bearing element of plastic, the bearing and supporting faces being arranged inside the sealed grease chamber. Preferably the bearing element is made in one piece with a damping element of plastic.

9 Claims, 6 Drawing Sheets

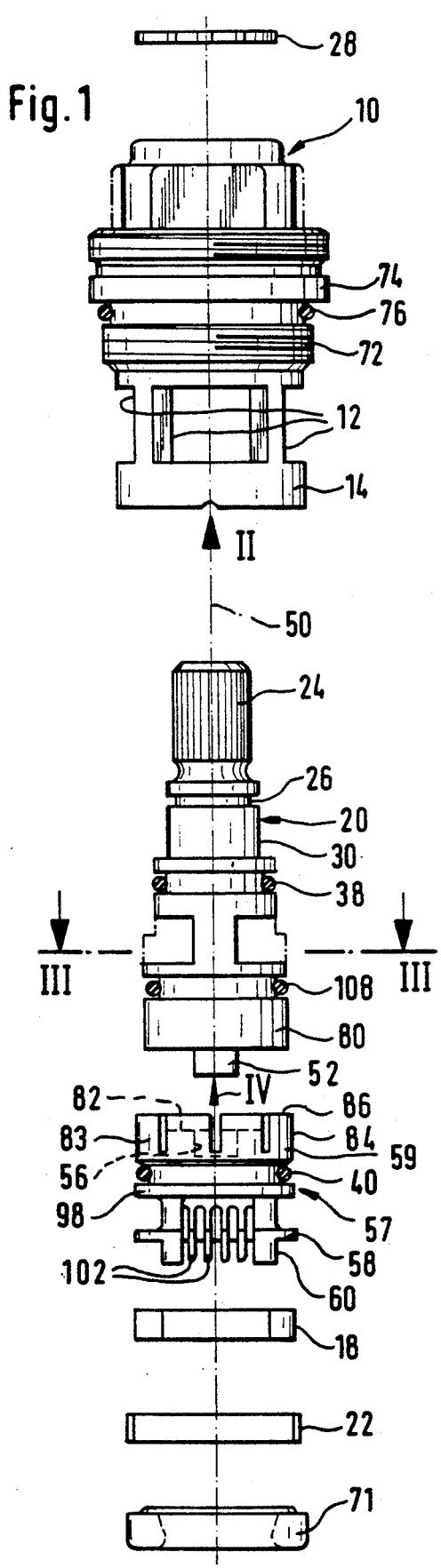
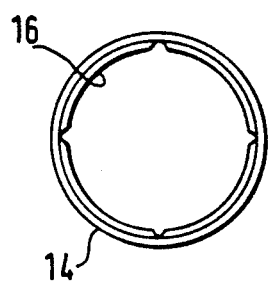
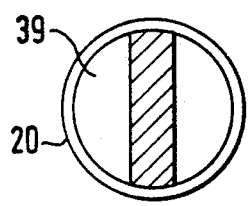
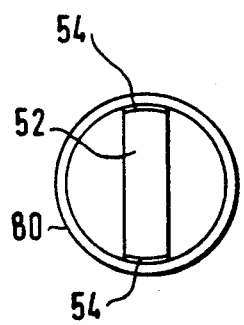

VALVE TOP

The invention relates to a valve top, in particular for water fittings, according to the preamble of claim 1.

A valve top of this kind is known from DE-PS 37 14 450.

For the mounting of the spindle in the head-piece the known valve top cannot manage entirely without metallic guiding and sliding parts. Besides, the manufacture and installation are relatively costly. The spindle is not mounted free of axial pressure, and not all sliding parts lie in the waterfree space formed by the grease chamber.

The invention aims to improve the mounting of the spindle in the head-piece of such a valve top and to make the manufacture simpler and cheaper.

This problem is solved according to the invention by the characterizing features of claim 1.

Due to the combination of axial and radial sliding bearing according to the invention, no metallic contact occurs in the system. By avoiding the metal friction, which might lead to metal attrition, the life of the valve top in long use is greatly improved in comparison with known valve tops.

Ease of motion and long-term slackfree mounting are ensured, as extremely narrow manufacturing tolerances are possible. The axial support absorbs the entire axial seal pressure, and this makes the spindle free of axial pressure and not subject to any wear. The axial bearing play can be determined exactly. Despite the excellent mounting, the entire valve top can be manufactured in standard dimensions, and moreover smaller initial material diameters of the spindle can be used. Especially advantageous is the arrangement of the slide ring and of the axial and radial support of the control block sliding with it inside the grease chamber sealed against the fluid or water, the grease filling in the chamber taking care of permanent greasing of the bearing surfaces. The grease filling cannot be washed out and thus does not appear in the fluid, e.g. drinking water. Complete physiological safety results therefrom.

Especially appropriate is the form of realization according to claim 2, as the one-piece part consisting of a bearing element and damping element is very easy to install.

Thus a simple non-rotational union obtainable by plugging in and/or snapping in according to claim 3 can be achieved.

To improve the sliding properties and the life of the sliding bearing between the bearing element and head-piece, a lubrication according to claims 4 and 5 can be effected in advantageous development of the invention.

For still better support of the bearing element in the head-piece, according to claim 6 the supporting face can extend into the unsealed zone outside the grease chamber, at least by a short section, owing to which the seal ring sealing at this point will lie practically in a groove of the entire radial supporting face. If as an exception the friction is insufficient due to the favorable sliding properties and lubrication of the bearing, it is possible in further development according to claim 7 to provide inside the grease chamber an additional friction-increasing O-ring, which may be expedient especially for relatively large handles, preferably lever handles at the valve, as well as on wall-mounted fittings.

In advantageous development of the invention according to claims 8 and 9, the approach flow of the valve top can be kept to a very low noise level by a special design of the approach and guide channel even for relatively small throughputs which would otherwise lead to strong turbulences and thus to much noise.

Advantageous embodiment examples of the invention are explained more specifically with reference to the figures.

Figure 6:
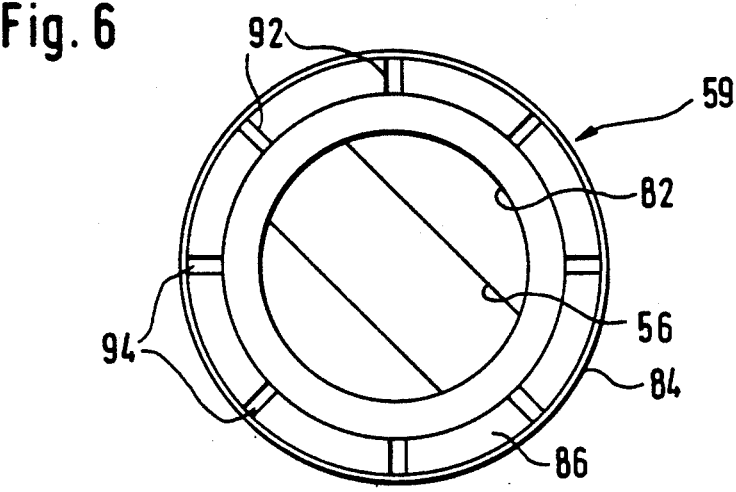
Figure 7:
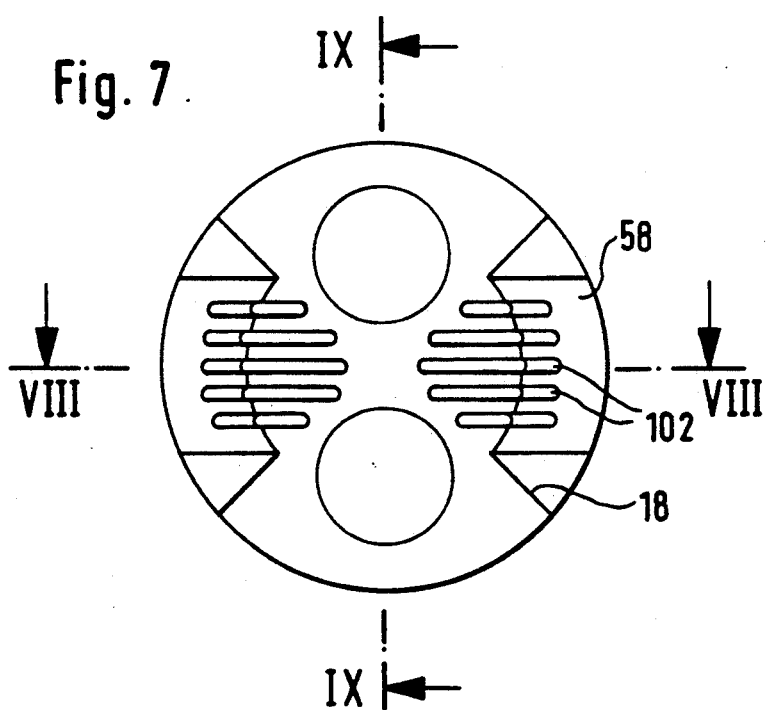
Figure 8:
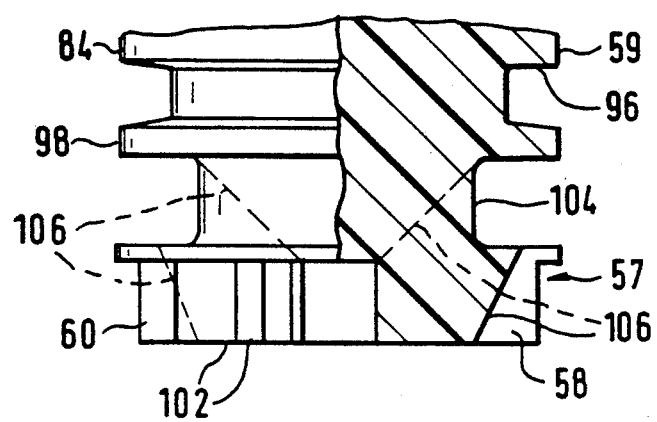
Figure 9:
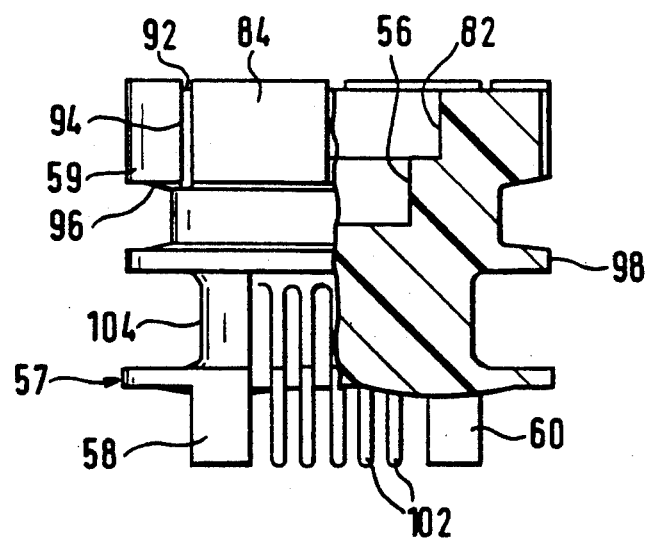
Figure 10:
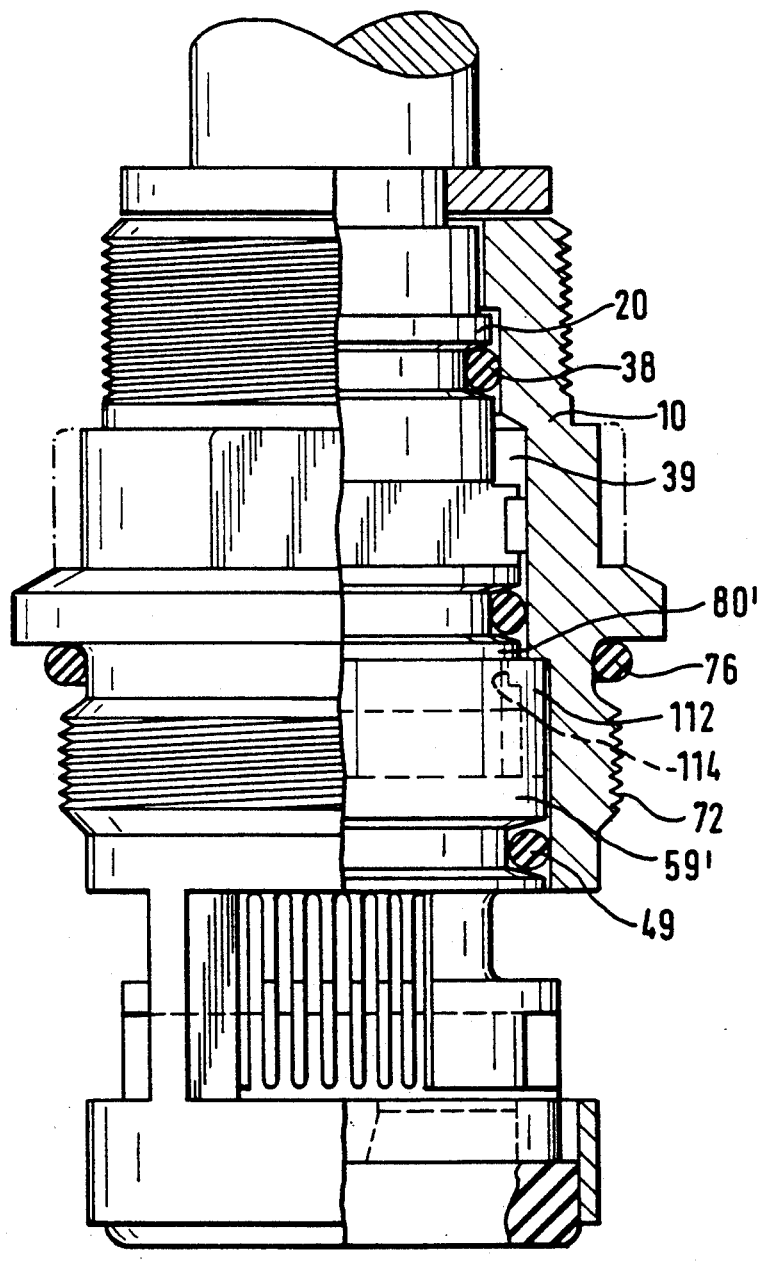
Figure 11:
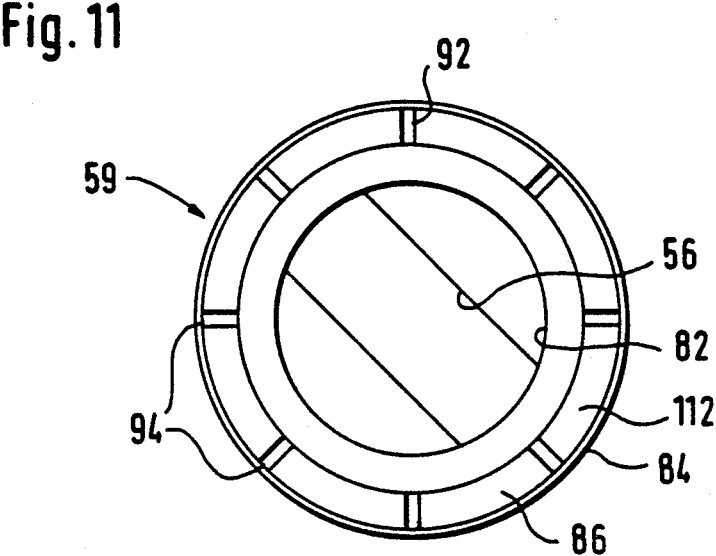
Figure 12:
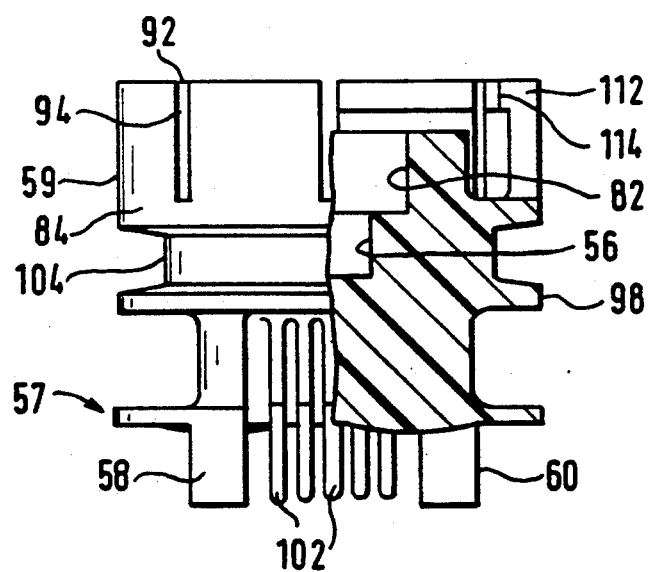

FIG. 1 shows an exploded view of the valve top according to the invention;

FIG. 2, a front view along arrow II in FIG. 1;

FIG. 3, a section along line III—III in FIG. 1;

FIG. 4, a front view along arrow IV in FIG. 1;

FIG. 5, a side view, sectioned in the right half, of a first form of realization of the assembled valve top per FIGS. 1 to 4;

FIG. 6, a front view of the part consisting of a bearing element and damping element per FIG. 5, from above;

FIG. 7, a front view of the part shown in FIG. 6, from below;

FIG. 8, a partial side view, sectioned in the right half along line VIII—VIII in FIG. 7, of the part shown in FIGS. 6 and 7;

FIG. 9, a side view, sectioned in the right half along line IX—IX in FIG. 7, of the part shown in FIGS. 6 and 7;

FIG. 10, a side view, corresponding to FIG. 5 and partially sectioned, of a second form of realization of the assembled valve top;

FIG. 11, a front view corresponding to FIG. 6 of the part of the second form of realization per FIG. 5, consisting of a bearing element and damping element;

FIG. 12, a representation corresponding to FIG. 9 of the part shown in FIG. 11.

The first form of realization of the valve top according to the invention, illustrated in FIGS. 1 to 9, consists essentially of two main parts fitted one into the other and rotatable relative to each other, namely the head-piece 10 forming the valve housing and the spindle 20 received in the interior of head-piece 10 for rotation with narrow tolerances. In its lower zone the head-piece 10 has a circle of four windows 12 staggered at 90° for radial passage of water. Below the circle of windows 12 the head-piece 10 forms a ring 14 which forms a cylindrical inner surface 16 to seat a base disk 22, above which a control disk 18 rotatable relative thereto is arranged.

At its upper end, spindle 20 has a knurl 24 serving to plug on an actuator means not shown, as well as a circular groove 26 for anchoring a safety disk 28 for spindle 20 inserted in the head-piece 10. A collar 30 disposed in the upper zone of spindle 20 abuts, in the position fitted together per FIG. 5, against a corresponding inner face 34 of the head-piece, without making contact but with narrow tolerances, and provides for proper rotation of the spindle 20 in the upper part of head-piece 10. Below collar 30, a sealing and radial guiding ring 38 is mounted in the spindle, which ring abuts in the state fitted together per FIG. 5 against the inner wall of head-piece 10 in a sealing and guiding manner.

Protruding from the lower front side of spindle 20 is an engaging rib 52 extending radially through the center axis 50 of the spindle; in the two abutment positions of the spindle 20 it is arranged with its radial ends 54 between pairs of windows 12 of the head-piece 10. Owing to this it does not hinder the flow of traversing water, but it is adapted to engage in a groove 56 of a one-piece part of slidable material, e.g. plastic, referenced generally by 57, consisting of a lower damping element 58 and an upper bearing element 59. Thereby part 57 is taken along with the spindle rotation. Fitted firmly on a shoulder 60 of the damping element 58 is the essentially circular control disk 18. Abutting flat against the underside of control disk 18 is the base disk 22, which is locked against rotation in the head-piece 10. As seal against the housing of a fitting not otherwise shown, into which the valve top is to be inserted, a seal ring 71 slightly protruding from the lower end of the valve top is inserted below the base disk 22. Further the head-piece 10 comprises for this purpose a customary male thread 72 and an outer seal ring 76 abutting against a stop ring 74.

A collet 80 at the lower end of spindle 20 is inserted flush in a recess 82 of the bearing element 59. Bearing element 59 has a slide ring 83 with a cylindrical radial support face 84 and with an upwardly pointing annular axial support face 86, which take support on corresponding inner slide faces 88, 90 of head-piece 10. In the axial support face 86 a circle of radially extending lubration grooves 92 is provided, which terminate at the outer edge in axially extending lubrication grooves 94 disposed in the radial support face 84. Below the slide ring 83, the bearing element 59 has an annular groove 96 in which a sealing and radial guiding ring 40 is arranged. Contiguous to the groove 96 downwardly is a support face section 98 coaxial with the radial support face 84, which could take support on a corresponding inner sliding face section 100 of head-piece 10. As the entire part 57 with the bearing element 59 and the damping element 58 is made of plastic or the like and as moreover a lubrication of the support faces 84 and 86 takes place, there results an excellent, low-wear suspension at the lower end of spindle 20. Between the sealing and radial guiding rings 38 and 40 a sealed grease chamber 39 is formed, so that the lubricants introduced into this grease chamber cannot be washed out by fluid. Installation of part 57 on the spindle can be done very simply by plugging on.

The lower section of part 57, made in one piece of plastic or the like, is formed by the damping element 58, which besides noise-reducing ribs 102 comprises for further noise attenuation an outflow channel 104 in the form of an annular groove and guide channels 106 associated therewith with obliquely inclined approach faces. In the view from below in FIG. 7 there is indicated in addition the form of the control disk 18 placed on the damping element 58. It can be seen from this arrangement that in the illustrated valve top the spindle is rotatable 90° between the open and closed positions of the valve. In principle, with a different arrangement of the openings of the base disk 22 and minor modifications, any desired closing angle variations are possible, as for instance a 180° closing angle design.

For further guiding and possibly for achieving a greater self-restraint against the rotary movement of the spindle, there is provided in the illustrated form of realization a further sealing and radial guiding ring 108 inside the grease chamber formed by the seal rings 38 and 40 on spindle 20. Below collar 30 there is provided further an additional slide ring 110 for axial and radial support of spindle 20 in head-piece 10.

The second embodiment of the invention illustrated in FIGS. 10 to 12, which likewise contains all parts shown in FIG. 1, differs from the first embodiment per FIGS. 5 to 9 only by the features described in the following. Otherwise the same reference symbols as for the first embodiment are used for similar parts.

In the second form of realization, the bearing element 59' is provided with an annular elastic snap ring 112, which can be snapped into a corresponding annular recess 114 of collet 80' at the lower end of spindle 20. At the same time the engaging rib 52 is inserted in the groove 56 provided for that purpose. This results in an axial and radial fixation of the bearing element 59' on spindle 20 very easy to install.

We claim:

1. Valve top, of a valve, in particular for water fittings, having a housing type head-piece, a spindle with a lower end disposed therein for rotation between two stop positions, and a grease chamber inside the head-piece sealed against fluid by two seal rings, characterized in that the lower end of the spindle is mounted in the head-piece by means of a bearing element of a slidable plastic material, an axial and a radial support face of a slide ring of said bearing element being supported on corresponding inner slide faces of said head-piece, so that a non-rotational union exists between said spindle and said bearing element, and that the slide ring of said bearing element is arranged inside the sealed grease chamber.

2. Valve top according to claim 1, characterized in that the bearing element is formed in one piece of a damping element of plastic protruding into the fluid zone of said valve and having damping ribs.

3. Valve top according to claim 1 or 2, characterized in that for the non-rotational union said spindle engages by an engaging rib into a corresponding groove of said bearing element and/or a mutually locking snap union is provided between said spindle and said bearing element.

4. Valve top according to claim 1, further including lubrication grooves provided in said axial support face and in said radial support face.

5. Valve top according to claim 4, characterized in that the lubrication grooves extend radially in the axial support face and axially in the radial support face and merge one into the other.

6. Valve top according to claim 1, characterized in that said radial support face of said slide ring is coaxially continued by a radial support face section arranged outside a sealing and guiding ring for said grease chamber, which radial support face section is supported by a corresponding inner slide face section of said head-piece.

7. Valve top according to claim 1, characterized in that, to increase the friction between said spindle and said head-piece, a central O-ring is provided inside said grease chamber sealed by said two seal rings.

8. Valve top according to claim 2, characterized in that the damping element has in the region of the damping ribs an annular groove type outflow channel.

9. Valve top according to claim 8, characterized in that associated with said outflow channel a guide channel with obliquely inclined approach faces.

* * * * *